S. DAVIS.
BUTTIS.

116692      PATENTED JUL. 4,1871.

Witnesses.
A. Ruppert
B. Edw. J. Eils

S. Davis
Inventor.
D. S. Holloway & Co
Attys

UNITED STATES PATENT OFFICE.

SAMUEL DAVIS, OF NEW TRENTON, INDIANA.

IMPROVEMENT IN BUTTERISES.

Specification forming part of Letters Patent No. 116,692, dated July 4, 1871.

*To all whom it may concern:*

Be it known that I, SAMUEL DAVIS, of New Trenton, in the county of Franklin and State of Indiana, have invented certain Improvements in Blacksmiths' Butteris; and I do hereby declare that the following is a clear, full, and exact description thereof, reference being had to the annexed drawing making part of this specification, in which—

Figure 1:
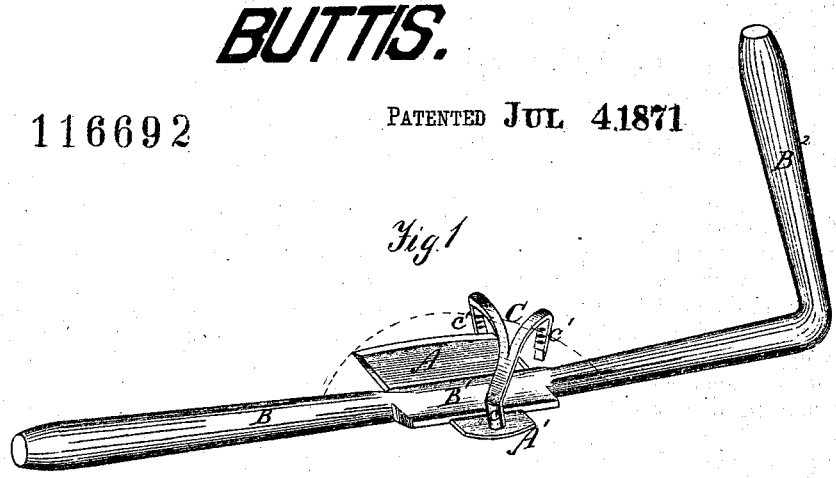
Figure 2:
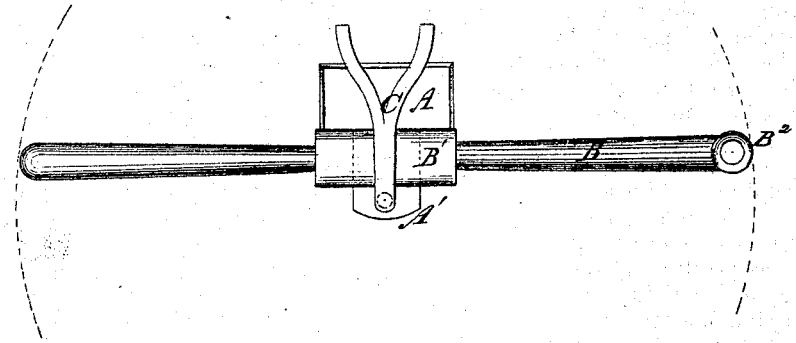
Figure 3:
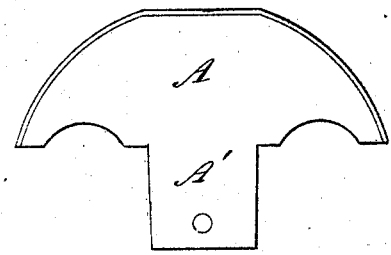

Figure 1 is a perspective view of my improved butteris. Fig. 2 is a plan view. Fig. 3 shows a knife of different form from that shown in the preceding figures.

The same letters are used in all the figures in the designation of identical parts.

This invention, relating to a tool for paring off the hoofs of animals preparatory to putting on the shoes, and which is commonly denominated a blacksmith's butteris, consists in the employment of a claw, in combination with the knife-bar or handles of the instrument, which claw is pivoted to the bar at some point between its ends, and in such relation to the knife that it can be hooked over the toe of the hoof and permit the knife to pare the hoof over its entire surface without changing the position of the claw.

I do not propose to claim, broadly, the combination, with a blacksmith's butteris, of a claw, which, in using the tool, is hooked over the edge of the hoof, and serves as the fulcrum upon which the other parts turn, as I am aware that this is not new; but only when the claw is arranged in the peculiar manner specified, which is an improvement over the old mode.

To enable those skilled in the art to make and use my invention, I will proceed to describe its construction and operation.

The knife A of the instrument, the blade of which may have either the form shown in Figs. 1 and 2, or that illustrated in Fig. 3, is inserted by its shank A' in a dovetailed recess or groove formed transversely across the central widened part $B^1$ of the bar B. The latter extends from either side of this enlarged part for a sufficient distance to form handles by which to operate the device. As shown, at one end this bar terminates in a handle, $B^2$, bent upward and at nearly right angles thereto, for greater convenience in handling the tool. The knife is held firmly in place in the part $B^1$ by passing the stud $c$ of the claw C through an eye in the shank at the point where it leaves such part $B^1$, on the rear edge of which the stud turns. The stud of the claw should be pivoted in the shank of the blade in such a manner as to permit of ready detachment of one from the other for purposes of repairing or sharpening the parts. The length of the claw is such that the corners of the knife will just clear its hooks $c'$ $c'$ in turning one on the other. The inner sides of the hooks $c'$ are serrated or roughened, in order that they may take a firm hold of the hoof in applying the tool.

It is obvious that the claw may be pivoted to the knife-bar in a permanent manner. In such case a set-screw might be employed to clamp the knife to its seat. In every case the knife must be made of the proper length, and so arranged with relation to the stud of the claw on which the instrument turns that it will, in oscillating it under the shank of the claw, sweep over the entire surface of the hoof and pare it at every point without changing the position of the claw.

What I claim as my invention, and desire to secure by Letters Patent, is—

The combination of the knife A, bar B, and claw C, when the latter is pivoted at some point between the ends of the bar, and in relation to the knife, substantially in the manner and for the purpose set forth.

In testimony whereof I have signed my name to this specification in the presence of two subscribing witnesses.

SAMUEL DAVIS.

Witnesses:
 O. B. DAVIS,
 H. W. DAVIS.